US011042738B2

(12) United States Patent
Stuck

(10) Patent No.: US 11,042,738 B2
(45) Date of Patent: Jun. 22, 2021

(54) SIMPLE AUTHENTICATION OF ELEMENTS IN BLISTER PACKAGES

(71) Applicant: I-PROPERTY HOLDING CORP., Sarasota, FL (US)

(72) Inventor: Alexander Stuck, Wettingen (CH)

(73) Assignee: I-Property Holding Corp., Sarasota, FL (US)

( * ) Notice: Subject to any disclaimer, the term of this patent is extended or adjusted under 35 U.S.C. 154(b) by 404 days.

(21) Appl. No.: 15/565,966

(22) PCT Filed: Apr. 22, 2016

(86) PCT No.: PCT/US2016/028872
§ 371 (c)(1),
(2) Date: Oct. 12, 2017

(87) PCT Pub. No.: WO2016/172503
PCT Pub. Date: Oct. 27, 2016

(65) Prior Publication Data
US 2018/0060657 A1  Mar. 1, 2018

Related U.S. Application Data

(60) Provisional application No. 62/151,498, filed on Apr. 23, 2015.

(51) Int. Cl.
*G06K 9/00* (2006.01)
*G06T 7/70* (2017.01)
(Continued)

(52) U.S. Cl.
CPC ........... *G06K 9/00577* (2013.01); *A61J 1/035* (2013.01); *G06K 7/10722* (2013.01);
(Continued)

(58) Field of Classification Search
CPC ........... G06K 9/00577; G06K 7/10722; G06K 7/1417; G06K 9/22; G06K 9/6202;
(Continued)

(56) References Cited

U.S. PATENT DOCUMENTS 3,397,671 A * 8/1968 Hartman, Jr. ........... A61F 6/142
                                                                206/532
5,845,264 A * 12/1998 Nellhaus ............. G06F 19/3462
                                                                705/28
(Continued)

FOREIGN PATENT DOCUMENTS

EP          2383705 B1     10/2012
WO      2014122479 A2      8/2014

OTHER PUBLICATIONS

International Searching Authority, Search Report and Written Opinion issued in International Application No. PCT/US2016/028872 dated Oct. 4, 2016 (15 Pages).

*Primary Examiner* — Manav Seth
(74) *Attorney, Agent, or Firm* — Wood Herron & Evans LLP

(57) ABSTRACT

A simple and quick verification of the authenticity of a blister of elements, such as pills in the pharmaceutical industry, is provided. The pills packaged in a blister can be authenticated using mobile imaging devices such as a mobile smartphone. Generally speaking, an image of the pills and their differentiating physical characteristics in the blister is acquired and compared to at least one code which is marked on the blister itself. This code may also be encrypted. A dedicated software application on the mobile smartphone can be used to decrypt the code and compare the code to the image of the pills in the blister, to thereby evaluate authenticity of the blister and its contents.

10 Claims, 4 Drawing Sheets

(51) Int. Cl.

| | | |
|---|---|---|
| *A61J 1/03* | (2006.01) | |
| *G06K 7/10* | (2006.01) | |
| *G06K 7/14* | (2006.01) | |
| *G06K 9/22* | (2006.01) | |
| *G06K 9/62* | (2006.01) | |
| *G06K 9/78* | (2006.01) | |
| *G06T 7/00* | (2017.01) | |
| *G06T 7/20* | (2017.01) | |
| *G06T 7/40* | (2017.01) | |
| *G06T 7/60* | (2017.01) | |
| *H04M 1/725* | (2021.01) | |

(52) U.S. Cl.
CPC ............ *G06K 7/1417* (2013.01); *G06K 9/22* (2013.01); *G06K 9/6202* (2013.01); *G06K 9/78* (2013.01); *G06T 7/001* (2013.01); *G06T 7/20* (2013.01); *G06T 7/40* (2013.01); *G06T 7/60* (2013.01); *G06T 7/70* (2017.01); *A61J 2205/40* (2013.01); *G06T 2200/04* (2013.01); *G06T 2200/24* (2013.01); *G06T 2207/30204* (2013.01); *H04M 1/725* (2013.01)

(58) Field of Classification Search
CPC .. G06K 9/78; G06T 7/70; G06T 7/001; G06T 7/20; G06T 7/40; G06T 7/60; G06T 2200/04; G06T 2200/24; G06T 2207/30204; A61J 1/035; A61J 2205/40; H04M 1/725
See application file for complete search history.

(56) References Cited

U.S. PATENT DOCUMENTS

| | | | | |
|---|---|---|---|---|
| 7,185,812 B2* | 3/2007 | Wong | ................ | G06Q 10/08 235/383 |
| 7,770,732 B2* | 8/2010 | Stroppolo | ............ | B65D 75/32 206/528 |
| 7,815,117 B2* | 10/2010 | Tuschel | ........... | G06K 19/06028 235/462.01 |
| 8,626,672 B2* | 1/2014 | Stuck | ...................... | G06K 9/00 235/375 |
| 8,715,725 B2* | 5/2014 | Stuck | ..................... | A61J 3/007 424/464 |
| 8,888,005 B2* | 11/2014 | Prokop | .................. | A61J 3/007 235/440 |
| 8,914,146 B2* | 12/2014 | Carson | ................ | G07F 17/0092 700/216 |
| 9,189,728 B2* | 11/2015 | Stuck | ................. | G06K 9/00577 |
| 2006/0226234 A1* | 10/2006 | Kettinger | ......... | G06K 19/06037 235/487 |
| 2007/0086625 A1* | 4/2007 | Polli | .................... | G01N 21/359 382/115 |
| 2007/0219916 A1* | 9/2007 | Lucas | ................... | G06Q 10/08 705/58 |
| 2007/0241177 A1* | 10/2007 | Tuschel | ........... | G06K 19/06028 235/375 |
| 2008/0181447 A1* | 7/2008 | Adams | ................... | G06K 17/00 382/100 |
| 2011/0091068 A1* | 4/2011 | Stuck | ................ | G06Q 30/0185 382/103 |
| 2011/0186629 A1* | 8/2011 | Stuck | .................... | G06K 19/14 235/380 |
| 2011/0188051 A1* | 8/2011 | Stuck | .................... | A61J 3/007 356/511 |
| 2011/0247960 A1* | 10/2011 | Gogo | .................. | B65D 55/026 206/531 |
| 2013/0173484 A1* | 7/2013 | Wesby | .................. | G06Q 30/06 705/318 |
| 2015/0032463 A1* | 1/2015 | Pasricha | ............... | G06Q 50/22 705/2 |
| 2015/0183257 A1* | 7/2015 | Glendenning | ....... | B42D 25/425 206/459.5 |

\* cited by examiner

SIMPLE AUTHENTICATION OF ELEMENTS IN BLISTER PACKAGES

CROSS-REFERENCE TO RELATED APPLICATIONS

This application is a national phase of PCT/US2016/028872, filed on Apr. 22, 2016, which claims priority to U.S. Provisional Patent Application Ser. No. 62/151,498, filed Apr. 23, 2015, each of which is incorporated by reference herein in its entirety.

TECHNICAL FIELD

This disclosure relates to the tracking of pharmaceutical tablets and other elements stored in blisters, to verify authenticity thereof.

BACKGROUND

Pharmaceuticals and cosmetics are high technology products which require very specialized material systems and production procedures as well as very large investments in development and marketing. Because of public safety concerns, authorities place very stringent requirements on the verification and authenticity of such products. Companies therefore have to make huge investments in the tracking and tracing of these products to ensure authenticity. In addition, as these products usually have large sales margins and are distributed globally, it is not surprising that cosmetics manufacturers and pharmaceutical companies suffer from enormous losses due to counterfeiting. The problem has been aggravated by strongly increased sales over the internet, where everything from counterfeit Viagra to false glucose tests is readily available. Furthermore, local regulations are becoming more stringent regarding the authentication process required for distribution of elements like pharmaceuticals.

Track-and-trace features in the pharmaceutical market have been applied to packages. For example, holograms, optically variable inks, fluorescent dyes, and other identification features are attached to the packages, e.g., by adhesive tags. Alternatively, such labels are laminated to the carton or are directly applied to the packages. The main drawback of such labels is that they are not an integral part of the tablet and therefore do not provide 100% security. For example, if the authentic product is separated from the package, the package can be refilled with a false product. Therefore, direct verification of an authentic tablet, and ensuring that the authentic tablet is in the correct package, remains a primary concern.

SUMMARY

According to one generalized embodiment, verification of a secured blister is provided by taking an image of the blister with a mobile smartphone or other mobile imaging device from the front side to determine a physical sequence defined by pills in the blister and another image of the back side of the blister which contains a datamatrix code for authentication. The smartphone contains a dedicated software application with which the images or photographs can be taken, and then it is determined whether authenticity is confirmed by the captured images. In response to the authentication, the smartphone generates a green/red lamp signal or some other similar indication on the display of the smartphone to show the user if the blister is authentic or not. Therefore, a simple and quick authentication of pills in blisters is provided.

In another embodiment, scanning the printed and secured barcodes on several blisters, which are all contained within a same pharmaceutical package, such as a paper or carton box, and comparing these secured blister codes with a printed code on the outside of the pharmaceutical package (which may also be cryptographically secured), allows a user to authenticate the pharmaceutical package with all of its contents, e.g., the blisters. In such a manner, a simple but highly secure authentication of a single pharmaceutical package may be provided. During the step of scanning the printed and secured barcodes on several blisters, the printed blister codes may be scanned or imaged individually using a mobile phone or similar scanning device. The codes may be cryptographically secured, in which case a hash code is generated and then cryptographically compared to a hash code printed on the pharmaceutical package to authenticate the contents of the package. Advantageously, the cryptographic algorithm is such that the order of scanning of the blister codes does not affect the generated hash code. To this end, the algorithm is insensitive to the order of scanning of the individual blisters, so long as each blister is contained within the same pharmaceutical package. It will be appreciated that cryptographic locking of codes on the package and the blisters may be omitted in simplified alternative embodiments without departing from the scope of this disclosure, in which case some of the information may be written in open or overt code on the blisters or package.

In accordance with one specific embodiment, a method for tracking and tracing a blister and elements stored in cavities of the blister along a supply chain is provided. The method includes detecting, with a mobile imaging device, a 2-dimensional or 3-dimensional image of the elements in the blister. The elements in the blister have differentiating physical characteristics that provide a difference in appearance that can be detected and identified by the mobile imaging device. The mobile imaging device then analyzes the 2-dimensional or 3-dimensional image to determine a physical sequence collectively defined by a correlated sequence of cavity locations in the blister and the differentiating physical characteristics of the elements at those cavity locations. The method further includes detecting, with the mobile imaging device, at least one code located on the blister or on a package containing a plurality of blisters, the at least one code including information corresponding to the physical sequence. The mobile imaging device then compares the information in the at least one code with the physical sequence to determine if the blister and the elements stored therein are authentic. The method also includes communicating, with the mobile imaging device, a visual or audible indication to a user of the mobile imaging device regarding whether the blister and the elements are authentic.

In another embodiment, a method for tracking and tracing a package containing a plurality of blisters which store elements along a supply chain is provided. The method includes detecting, with a mobile imaging device, a at least one code located on one of the plurality of blisters contained in the package, the at least one code including identification information regarding the corresponding blister and the elements stored therein. This detecting of at least one code is repeated for at least two of the plurality of blisters contained in the package. Then, the method includes detecting, with the mobile imaging device, at least one package code located on the package and including identification information regarding all of the plurality of blisters contained in the package. The mobile imaging device compares the detected codes on the at least two blisters with the at least one package code to determine if these items are authentic. The mobile imaging device can also then communicate a visual or audible indication to a user regarding whether the plurality of blisters and the package are authentic.

In yet another embodiment, a blister is configured for tracking and tracing along a supply chain thereof. The blister includes a main body portion defining a plurality of cavities for receiving a corresponding plurality of elements. The elements have differentiating physical characteristics that provide a difference in appearance that can be detected and identified by a mobile imaging device. To this end, the plurality of elements collectively define a physical sequence based on a correlated sequence of cavity locations and the differentiating physical characteristics of the elements at those cavity locations. The blister further includes a backing sheet which seals closed the plurality of cavities after the plurality of elements is located within the plurality of cavities, and at least one code printed or embossed on the main body portion or the backing sheet. The at least one code includes information corresponding to the physical sequence. The blister and the elements stored therein can then be authenticated at the mobile imaging device by detecting and comparing the physical sequence with the information in the at least one code to confirm the information matches.

In still another embodiment, a package contains a plurality of blisters which store elements for tracking and tracing along a supply chain thereof. The package includes a container body sized to receive each of the plurality of blisters. At least one code is printed or embossed on each of the plurality of blisters, with the at least one code including identification information regarding the corresponding blister and the elements stored therein. The package also includes at least one package code printed or embossed on the container body, with the at least one package code including identification information regarding all of the plurality of blisters contained in the package. The package and the plurality of blisters stored therein can then be authenticated at the mobile imaging device by detecting and comparing the two sets of identification information to confirm the information matches.

These and other objects and advantages of the disclosed apparatus and methods will become more readily apparent during the following detailed description taken in conjunction with the drawings herein.

DETAILED DESCRIPTION

Figure 1:
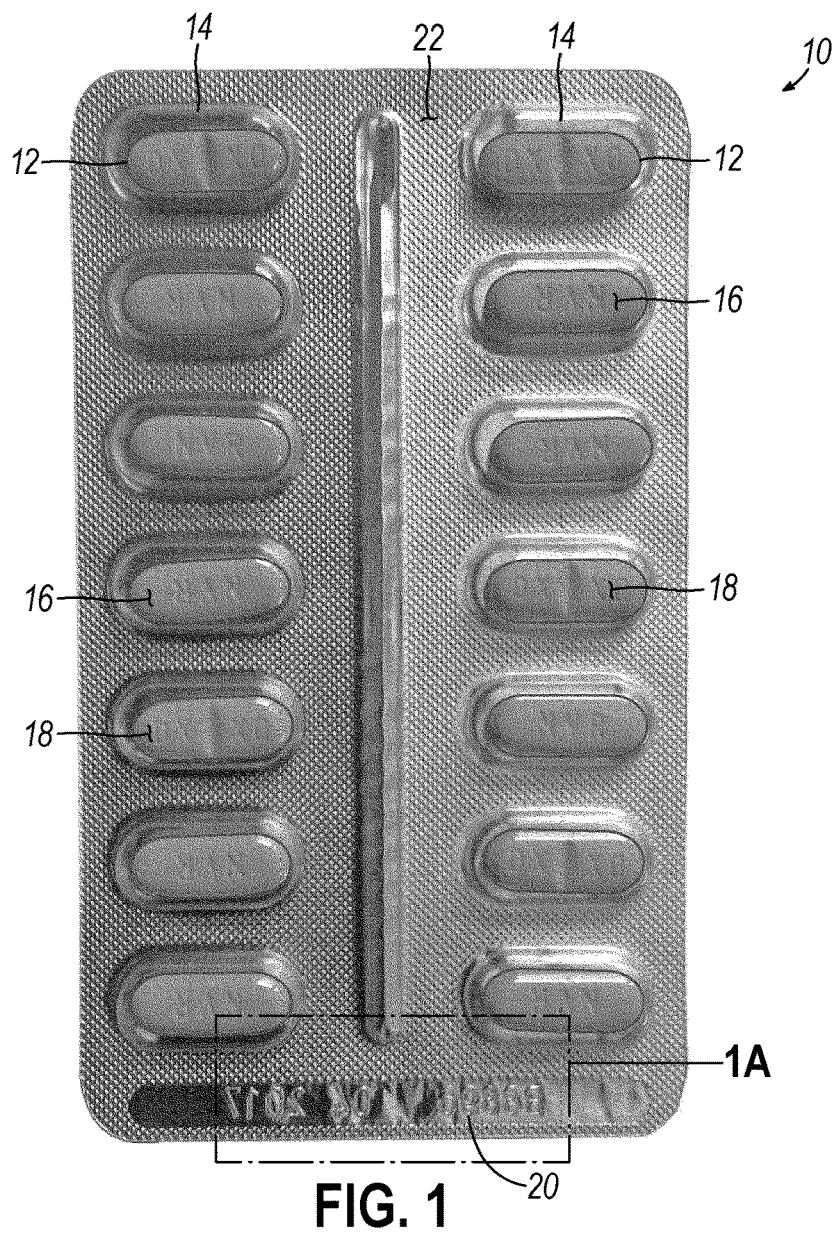
FIG. 1 is a photograph of a blister in accordance with one embodiment of the invention, the blister containing elements in the form of 14 pharmaceutical pills, which are embossed with marks so as to define a physical sequence of the pills that may be determined by a mobile imaging device, the blister also containing an overt code at the bottom of the blister.

The embodiments of the invention described herein enable simple and quick verification of the authenticity of a blister pack (also referred to as a "blister" herein) of elements, such as pills in the pharmaceutical industry. Such a process is advantageous to deter counterfeiting in these industries, and may be required under local, state, and federal laws and regulations as well. To this end, in one example of a method in accordance with the invention, pills packaged in a blister can be authenticated using mobile imaging devices such as a mobile smartphone without destruction of the blister. Generally speaking, a 2D or 3D image of the pills in the blister is acquired and compared to at least one code (hereinafter just referred to as the "code") which is marked either in or on the blister itself, for example by ink jet printing or embossing, or alternatively, in or on a pharmaceutical package containing the blister, such as a paper or carton box. This code contains information about the physical sequence in which the pills are arranged in the blister, and is typically encrypted as a digital signature for further enhancement of the security of this authentication process. A dedicated software application on the mobile smartphone can be used to decrypt the digital signature and compare the code to the image of the pills in the blister, and if the sequence of the pills matches the code, then the authenticity of the blister and its contents are confirmed for the user. Because such an authentication process occurs entirely on the smartphone and in the dedicated software application, the authentication can advantageously be provided within a short time period, such as within 1 second from when the image and digital signature are captured by the smartphone. Although certain specific embodiments of the blister and methods are illustrated and described below for exemplary purposes, it will be understood that this general simple and quick authentication may be applied in other similar contexts (e.g., such as with the use of different types of independent security features on the blister) without departing from the scope of the disclosure.

In order to enable the authentication process described in accordance with embodiments of this invention, the mobile imaging device must be configured to determine differences between elements in the blister (pills in the examples below) so as to determine the actual physical sequence of pills located in the blister. In other words, to determine the physical sequence, subgroups of the pills have to be distinguishable from each other. For example, a pill might have 2 different sides which are distinguishable by a camera. (one side embossed with a logo, number for example, the other side not). The pills in the blister form a random sequence, where for some pills the logo/number is visible and for others it is not visible. Moreover, where the logo/number is not symmetrical, the orientation of the logo/number may also help define the random sequence of pill positions within the blister. The physical sequence is a physical property of the blister and is randomized during manufacture and assembly of the blister, which means the physical sequence can then be used to authenticate the blister and its contents with the mobile imaging device.

Other exemplary distinguishing characteristics of pills that can be used to define the physical sequence might be size and form differences between the pills in the same blister (for example the outer shape dimensions, the surface curvature or the surface roughness might vary between different pills and act as reliable identifiers of pill subgroups). As noted below, the distinguishing characteristics may also be contained in other independent security features of the pill, including but not limited to: embossed holograms, optical verifiable ink, RFID tags, and similar elements. Regardless of the distinguishing characteristic(s) chosen to differentiate the pills, the only requirement of the mobile imaging device for this part of the authentication process is to be able to distinguish the different pill subgroups from each other by measuring and/or imaging the pills through the blister.

As set forth in further detail below, the manufacturing equipment that fills and assembles the blisters also includes an imaging device which has at least similar capabilities as the mobile imaging device to determine the physical sequence of pills in the blister. Therefore, during manufacturing of the blister, the physical sequence of each blister is read and used to generate a code for that particular blister. The code might also incorporate additional data, for example, date and time of manufacturing, pill designation, lot number, a computer generated number, etc. All this information is then put into the code and the blister and/or the pharmaceutical package containing the blister (e.g., the paper or carton box) are marked with the code, shortly after the imaging device has determined the physical sequence. This might for example take the form of a printed or embossed datamatrix code on the blister and/or the package. To enhance security and make a better authentication process, the code might also be crypto-graphically secured by encryption before being marked on the blister or its package. Accordingly, all of the elements needed for later authenticating the blister are provided during the manufacturing process and are provided on the blister itself and/or on the blister and its package. These manufacturing and authentication processes and the blister used for such authentication are described in further detail below.

Figure 1A:
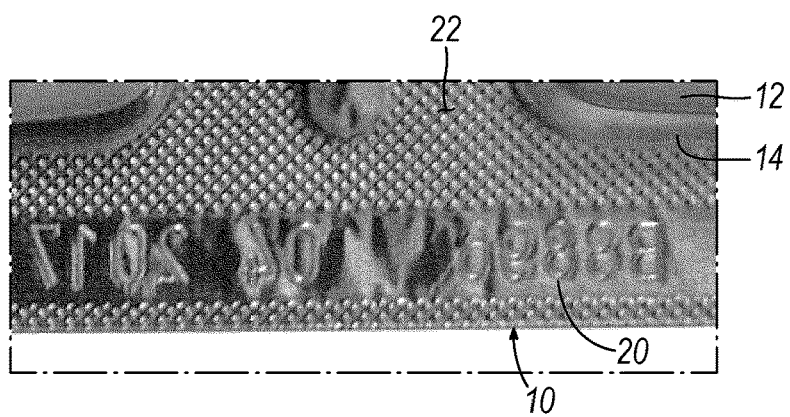
FIG. 1A is a detail view of the overt code on the blister of FIG. 1.

In accordance with one embodiment of the invention, FIG. 1 shows a photograph of a pharmaceutical blister 10 filled with elements, specifically pills 12. There are fourteen pills 12 in this blister 10, provided in a 2-by-7 physical arrangement within corresponding blister cavities 14 of the blister 10, the cavities 14 being defined in a main body portion of the blister 10 which is covered by a backing sheet typically made from a foil-like material when the cavities 14 are to be sealed closed. Each pill 12 has 2 different sides, a first side 16 being embossed with the logo NVR and a second side 18 being embossed with the logo DX XD (hereinafter referred to as "DX"). At the bottom of the blister 10, an optional overt embossed code 20 is provided, this overt code 20 including the expiry date (April 2017) and the lot number (B8896) associated with the blister 10. These elements of the overt code 20 are more specifically visible in the detailed view at FIG. 1A.

As alluded to above, the pills 12 in the blister 10 of FIG. 1 inherently define a physical sequence as a result of being loaded in different orientations within the cavities 14. For example, a binary sequence may be generated by defining that the sign NVR is equal to a logical 1 when face-up in a cavity 14, and the sign DX is equal to a logical 0 when face-up in a cavity 14. Therefore, in binary, the physical sequence of the blister 10 shown in FIG. 1 would be (from top left to bottom right): 00111110011011, which could also be converted to base 10 as: 3995. This binary sequence 00111110011011 is defined in positional/orientation language of the pills 12 as DX/DX/NVR/NVR/NVR/NVR/NVR/DX/DX/NVR/NVR/DX/NVR/NVR. This binary or physical sequence is the first part of an authentication pair.

By using the physical sequence and taking into account the lot number and the expiry date, a possible identifying sequence for this particular blister might be, for example, but not limited to: B889639950417. In this regard, the identifying sequence is some combination of elements in a string of characters, at least a portion of which defines the physical sequence of the pills 12 located in that particular blister 10. The identifying sequence is what is then used to form the second part of the authentication pair, which is the datamatrix code in this embodiment.

In a further example, the orientation of the asymmetrical NVR logo may also taken into account when defining the physical sequence. Therefore, a reverse NVR sign is assigned the logical number 2 when the NVR sign is face-up and upside down within the cavity 14. That results in a physical sequence of DX/DX/NVR rotated/NVR rotated/NVR/NVR rotated/NVR rotated/DX/DX/NVR/NVR rotated/DX/NVR rotated/NVR rotated, which correlates to a code with base 3, reading: 00221220012022, which converts to base 10 as: 509714. By using the physical sequence and taking into account the lot number and the expiry date, a possible identifying sequence for this particular blister might be, for example, but not limited to: B88965097140417. Either identifying sequence obtained in such a way can be encrypted and printed as part of the code on the blister, for example.

It will be understood that regardless of the particular identifying features which are used to distinguish the pills 12 in the blister 10 so as to define the physical sequence, a mobile imaging device can easily capture an image of a front side 22 of the blister 10 (e.g., the side 22 with the cavities 14) and detect those physical characteristic(s) or differences to determine what the physical sequence is. This determined physical sequence is used during manufacturing of the blister 10 to determine and provide the datamatrix code described below on the blister 10, and then used during in-field authentication as one element that is compared to another element to define whether a positive authentication is provided.

In one embodiment, the open information on the overt code 20 (such as the date and time of manufacture, lot number, etc.) together with the physical sequence of the pills 12 in the blister 10 collectively define an open message which can be read with an optical measurement device or similar imaging devices (e.g., such as with the smartphone described herein). The open message is analogous to the identifying sequence for the blister 10 as described above. Out of this open message, a hash code is generated and then encrypted with a private cryptographic key, as well understood in the authentication field. The result of such an encryption is an encrypted digital signature which is to be printed or embossed onto the blister 10 in this embodiment, either as part of the code or separately.

Figure 2:
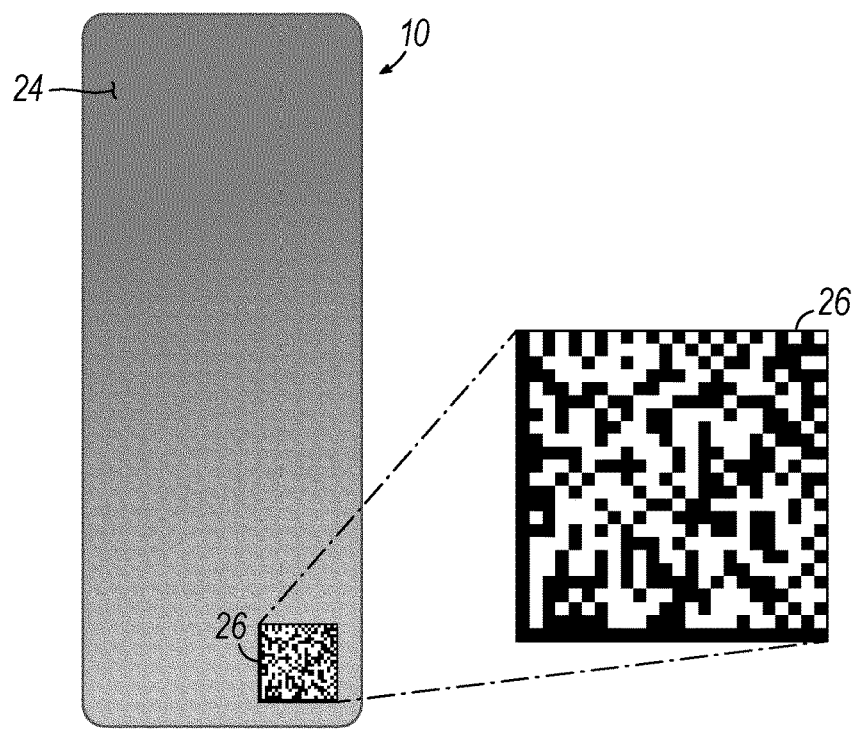
FIG. 2 is a sample datamatrix code, shown printed or embossed on an opposite side of the blister of FIG. 1 from the view shown in FIG. 1, allowing for secure and quick authentication of the blister when the data in the datamatrix code is compared to the physical sequence.

FIG. 2 illustrates the back side 24 of the blister 10, which in this embodiment includes one example of a datamatrix code 26 which is printed or embossed onto the blister 10 so as to provide the second part of an authentication pair. The datamatrix code 26 contains the encrypted identifying sequence or open message that is created by using the methodology described above. The datamatrix code 26 of the described embodiment reads, when decoded by the imaging device, for example: SEQ B889639950417 DT 120613183426 SIG 32645139912. More specifically, SEQ is the Sequence, DT is the date and time of manufacture (Jun. 12, 2013, at 18 h, 34 minutes and 26 seconds), and SIG is the digital signature used to authenticate the blister. Consequently, during an authentication, this digital signature is read and decrypted with the private cryptographic key to recover the hash code. The recovered hash code is then compared to the physical sequence detected when imaging the front side 22 of the blister 10. If the hash code matches the physical sequence, the blister is authentic, and has not been changed after initial manufacturing and production. If the hash code does not match the physical sequence, the blister 10 has either been tampered with or is a counterfeit. Thus, the authentication process involves a simple comparison of information from the datamatrix code 26 imaged from the back side 24 of the blister 10 (or from a pharmaceutical package such as a carton box containing the blister 10, in other embodiments) with information from the physical sequence determined from imaging the front side 22 of the blister 10. It will be appreciated that the overt embossed code 20 and/or the datamatrix code 26 may be provided in different types of known identifier codes, including but not limited to: a linear barcode, a 2D or 3D barcode, a QR code, a datamatrix code, or the like. Moreover, there may be a plurality of codes rather than just one or two codes 20, 26 as shown in this embodiment [some or all of which may be used in the authentication process herein], placed in various alternative locations like behind each pill or cavity, in other embodiments consistent with the scope of this invention.

Figure 3A:
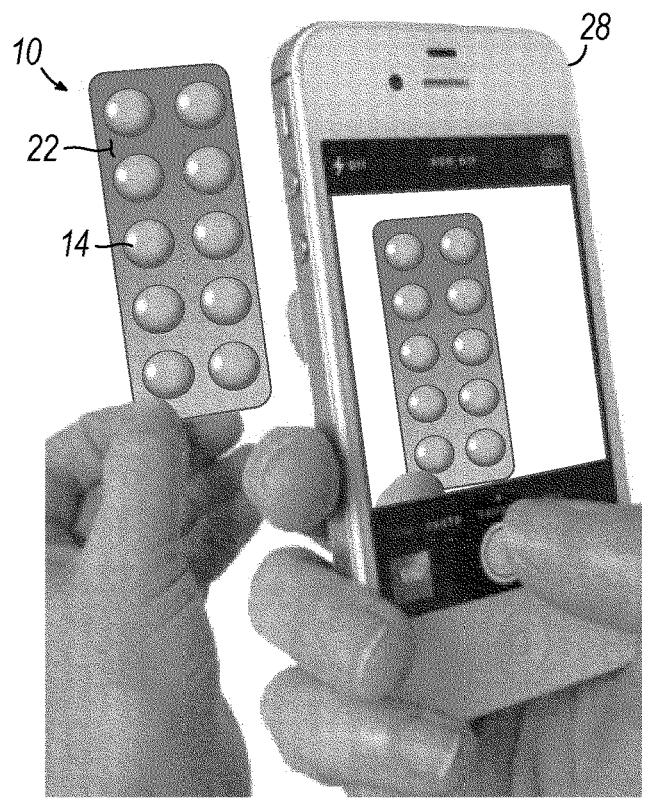
FIG. 3A is a photograph of a first step of the authentication process used with the blister of FIG. 1, specifically including taking an image of the pills in the blister to determine the physical sequence of the pills with a mobile imaging device such as a smartphone.
Figure 3B:
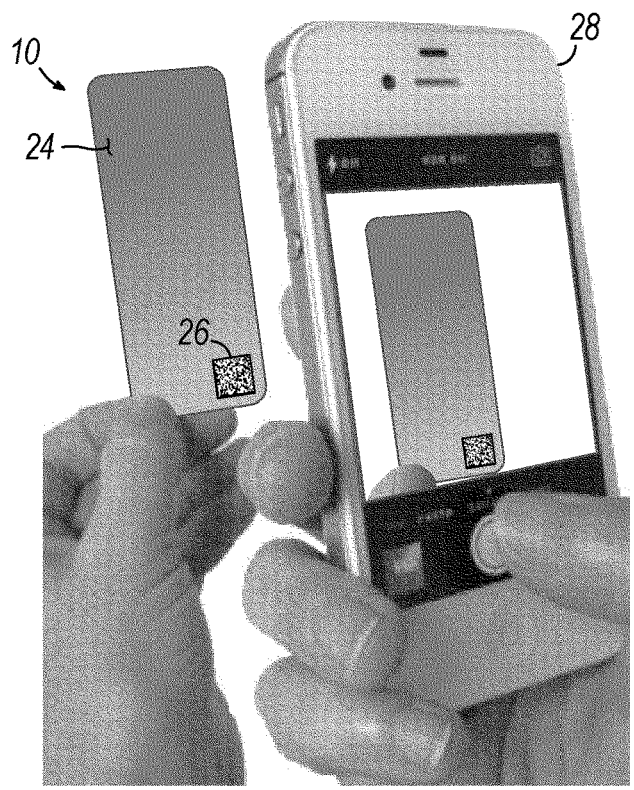
FIG. 3B is a schematic image of a second step of the authentication process of FIG. 3A, specifically including taking an image of the opposite side of the blister with the smartphone to capture the datamatrix code printed or embossed thereon.
Figure 3C:
FIG. 3C is a schematic image of a third step of the authentication process of FIG. 3A, where the smartphone provides feedback based on the comparison of the physical sequence and the information in the datamatrix code.

Once the blister 10 has been prepared in accordance with the description of this embodiment, a simple and quick authentication is enabled. Such an authentication process is schematically shown in steps in FIGS. 3A through 3C. To this end, FIG. 3A shows a first step of the authentication of the blister 10, which includes taking a picture of the front side 22 of the blister 10 with a mobile smartphone 28 (shown as an iPhone® commercially available from Apple, Inc. of Cupertino, Calif., but it will be understood other types of smartphones and mobile imaging devices could be used without departing from the scope of the disclosed invention). The smartphone 28 includes at least a camera, a user interface, and a memory with dedicated authentication software applications loaded therein for use with the verification process described below. This picture is used to determine the physical sequence of the pills 12 in the blister 10. FIG. 3B shows a second step of the authentication of the blister 10, which includes taking a picture of the datamatrix code 26 on the back side 24 of the blister 10. This picture is used to access the encrypted information which is to be compared to the physical sequence. A dedicated software application on the smartphone 28 or mobile imaging device can be used for determining the physical sequence and decrypting the information in the datamatrix code 26. The smartphone 28 and dedicated application then compare the information to evaluate whether the blister 10 and its contents are authentic. FIG. 3C shows a schematic indication of authenticity 30 provided on the screen of the smartphone 28. It will be understood that this indication 30 could be different colors for authenticated and not authenticated, or delivered in audible form as well as the visual representation on the screen. The indication 30 can advantageously be provided very quickly, such as within 1 second of taking the two images of the blister 10, as a result of the authentication happening entirely on the smartphone 28 and the dedicated software application, e.g., with no reliance on or communication with external (or other) databases.

Figure 4:
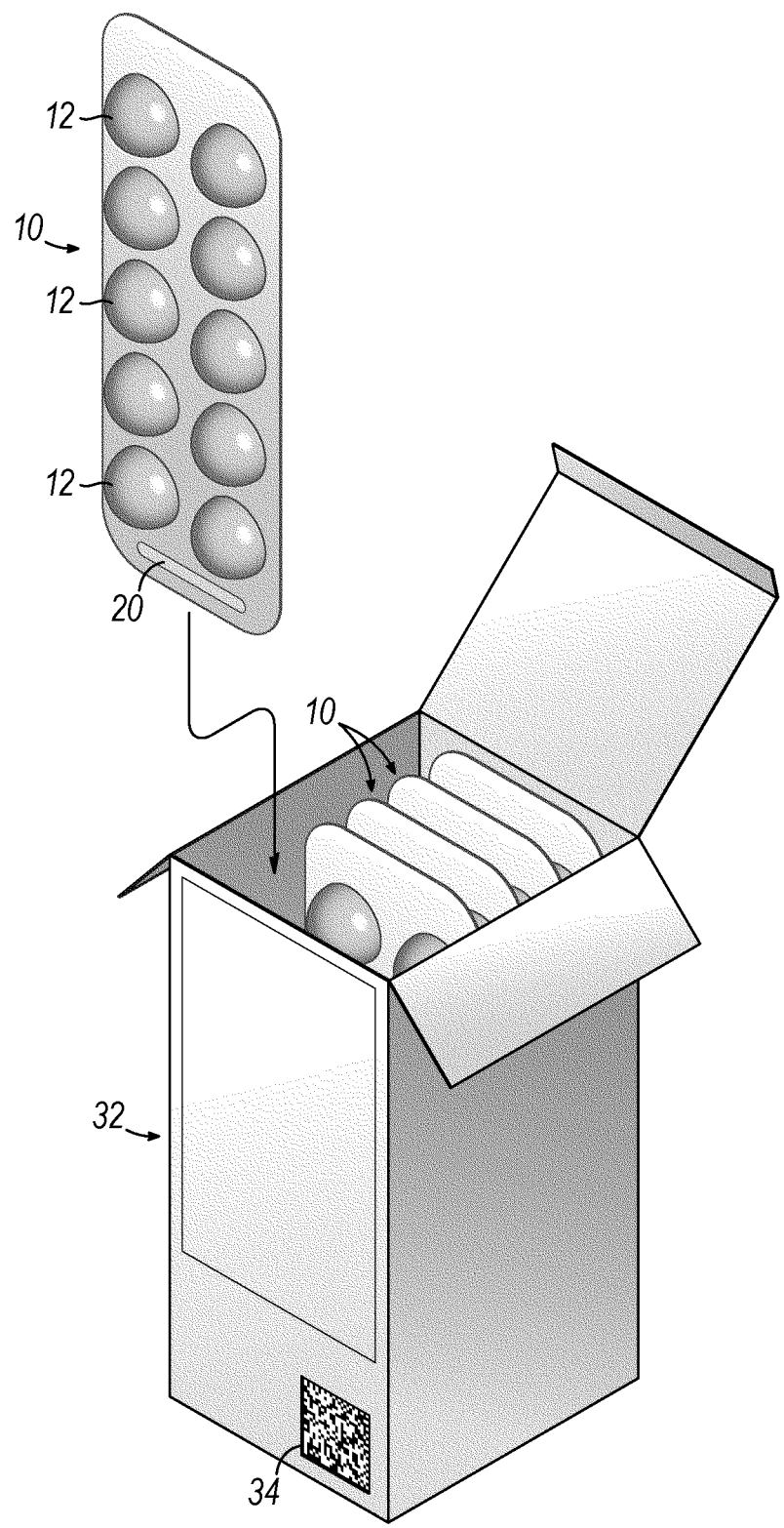
FIG. 4 is a perspective view of a pharmaceutical package in the form of a carton box containing multiple ones of the blister of FIG. 1, with an additional code formed on the pharmaceutical package for use in authenticating the blister(s) and/or the pills therein.

Another embodiment is illustrated in FIG. 4. To this end, FIG. 4 shows that one or more of the blisters 10 described above can be shipped along the supply chain within a pharmaceutical package 32, which in this case is shown as a paper or carton box defining a container body sized to receive the blisters 10. Just like the overt embossed code 20 and/or datamatrix code 26 provided on the blister 10, the pharmaceutical package 32 is provided with at least one printed or embossed code 34 that may take various forms, open or cryptographically locked. For example, the printed or embossed code 34 on or within the package 32 may include a linear barcode, a 2D or 3D barcode, a QR code, a datamatrix code, or the like. Moreover, it will be understood that the code 34 (or multiple codes 34) could be positioned on the outside of the package 32 as shown in FIG. 4 or in other locations, including inside the package 32 or on the lid of the package 32 in other embodiments.

The code 34 on the package 32 contains information regarding the blisters 10 stored within the package 32 and/or regarding the physical sequence of pills 12 held by those blisters 10. A similar process as that set forth above in FIGS. 3A through 3C may be followed to authenticate the blisters 10 in the pharmaceutical package 32: scanning or imaging one or more blisters in any order, then scanning the code 34 on the package 32, and comparing the information detected/scanned to verify whether the information matches, which would prove the authenticity of the blisters 10 or pills 12. Regardless of whether the various codes 20, 26, 34 are cryptographically locked or not, the algorithms operated by the verification software on the mobile smart phone or similar device is capable of performing the authentication described above regardless of the particular order in which blister(s) are scanned or imaged. Thus, the authentication process is simplified and conducted as quickly as possible.

In view of this examples illustrated in the FIGS., a more generalized description of the new and advantageous blister (apparatus) and methods is provided below, mostly without the reference numbers used throughout this description of one embodiment.

In summary, the current disclosure provides a production and authentication process which allows to authenticate blisters in a simple and quick manner with high confidence. Specific steps of the general production/manufacturing process and specific steps of the general authentication process are set forth in further detail below.

The following steps are performed in order to produce a secure blister or similar packaging, which may later be used for the simple and quick authentication process, according to one embodiment:

The blister has to be produced and sealed so as to contain at least 2 pills or more.

After production, preferably on the blister packaging machine itself or just shortly afterward, a 2- or 3-dimensional image of the pills in the blister is taken by making an optical measurement through the sealed blister. This measurement can be taken for example with industrial cameras, interferometers, line cameras, mobile phone cameras, or optical coherence tomographs, for example.

The 2- or 3- dimensional image data of the blister are then analyzed to identify differences between the pills in the blister. These differences can for example be differences in size and shape between individual pills which can be reliably classed into types (for example a pill might have two distinguishable sides and the camera measures at what position in the blister one side is up and at what position the other side is up). There might also be different pill diameters or pill curvatures, surface roughness, etc., distinguishing the pills. Out of these differences, an identifying sequence is generated which uniquely allows to identify which pill type sits at each position in the blister. This identifying sequence can be a numerical sequence and therefore describes a random physical property of this particular blister.

The sequence is then printed or embossed onto the blister, typically, but not necessarily onto the back side of the blister in the form of a datamatrix code together with other open information, such as date of manufacture, for example. Together with this open information the sequence forms the open message. The open message or parts of the open message, such as the identifying sequence, might be directly encrypted or alternatively cryptographically secured with a digital signature, using well known cryptographic schemes and known public/private keys, before being printed, embossed, or otherwise provided on the blister (and/or on a pharmaceutical package containing the blister).

It will be understood that some modifications may be provided to the process of producing a secure blister while remaining in accordance with this disclosure. For example, the blister and/or the pills may contain other independent security features which are used in conjunction with the authentication data already described when confirming that a blister and its contents are authentic. These independent security features, for example, may include embossed holograms, optical verifying ink, RFID tags, and other known forms of security features on the pills or the blister. Likewise, the encrypted information such as the datamatrix code can be provided in other manners beyond embossing or printing on the back side of a blister. In this regard, this encrypted information can be stored on an RFID chip included in the blister or in packaging of the blister (e.g., a box that contains multiple blisters in one example, or a transport container for receiving the blister), a laser-formed code, or other known alternative methods of providing encrypted codes and information. At a minimum, the blister and/or its packaging must contain the physical sequence of elements or pills and an encrypted code which can be compared to authenticate the blister and its contents, specifically with a mobile imaging device such as a smartphone without reliance on communication with an external network or server.

The following steps are performed in order to authenticate the blister, in accordance with one embodiment:

Take a 2- or 3- dimensional image of the pills in the blister with an optical device. This might be a mobile phone camera, a normal camera, an industrial camera, an interferometer, an optical coherence tomography, or the like.

Analyze the image to determine the physical sequence from the image taken in step 1.

Measure the open message and, if it exists, the encrypted code on the blister and/or on the pharmaceutical package (box containing the blister), for example, with a barcode scanner or also a mobile phone camera and read the open message and the code. Depending on the location of the open message, this step might actually already be contained in the imaging of step 1.

Compare the open message and/or the code (if it exists) with the physical sequence to determine if the blister is authentic or not. This step might include decrypting information either in the open message and/or the code.

Communicate to the user an indication of whether the blister is authentic or not, such as by displaying the analysis result on a screen (of a mobile phone camera for example), a printout, an audible signal, or by communicating it to a database.

In a simplified embodiment, the inventive authentication/verification process can be achieved with an application programmed on a mobile phone with a 2D camera. For example, if a linear or 2D barcode printed on the back side of the blister contains the open message and the code of the blister, a photo of the blister front side is taken to determine the physical sequence and a photo or an image scan from the back side is taken to read the barcode and therefore the open message and the code. The detected elements (physical sequence, open message and code) may then be compared by the mobile phone, for example using a dedicated software application to determine if the blister is authentic or not, this information can then be displayed by the phone and/or sent to a remote computer, if necessary, together with other information contained in the open message like date of manufacture and lot number. In this particular embodiment, the user makes one or several photographs with a mobile phone camera and receives the authentication result within less than 10 minutes, typically within less than 10 seconds, and preferably within even less than 1 second after taking the final photograph. If, in alternative embodiments, the portable imaging device must communicate with an external database (or with an internal database located in the memory of the portable imaging device) to finish the authentication, that could result in a few extra seconds as alluded to above. Regardless, the authentication is still a quick process compared with some conventional arrangements.

In one preferred embodiment, higher resolution scanners, in particular 3D scanning equipment with a depth resolution of 10 microns or better, are used with the authentication processes described above and throughout this application. For example, preferred 3D scanners include Fourier transform OCT (optical coherence tomography) devices or parallel OCT devices, as well as Confocal microscopes. Such 3D scanners allows the user to further distinguish groups of pills by identifying optical and mechanical material properties, all of which can be useful during authentication. In one example, a high-resolution 3D scanner measures the average surface roughness of each pill. That measured surface roughness can then be used in various ways for authentication, including comparing the measured surface roughness with predetermined surface roughness of a correct original pill coating material, comparing small changes in surface curvature or profile forms, comparing depth of logos identified in the pills, etc. Such high-resolution 3D scanners advantageously provide all of these options for information to evaluate in the authentication process, essentially enabling various types of forensic level analysis and evaluation in the simple authentication methods described herein without destroying or modifying the blister itself. Furthermore, these types of high-resolution 3D scanners can be portable and deployed at critical check points in the supply chain, including at pharmacies, repackaging sites, and other locations like police stations which require forensic level authentication of products contained in blisters. In addition, 3D scanners also reliably detect and identify embossed or printed barcodes, when those are the elements used for authentication. In such embodiments, the authentication process enabled by the invention described herein also complies with newer government requirements on supply chain controls in the pharmaceutical industry, including electronic pedigree and "track and trace" requirements being enacted by 2017 in California as well as potentially other U.S. states and jurisdictions.

As all information necessary for authentication is on the blister itself or on the packaging of the blister in this case, the authentication process also works without access to any external database, i.e. without any network connection, if so desired. That can provide the preferable authentication turn-around time as described above in these embodiments.

In summary, the blister filled with products or other elements (such as pills for example) can be distinguished into at least 2 (more is also possible) types using a portable imaging device, such as a mobile smartphone, a 3D or 2D camera, an interferometer, an optical coherence tomography, or the like. The imaging device is preferably capable of identifying the type to which a part belongs with a statistical 1 sigma probability of 85% or more. Variations used to distinguish different elements might be: size, shape, surface roughness and the like. Furthermore the blister or its packaging also has a code, printed or embossed on or in it (typically but not limited to a datamatrix code or linear barcode, alternatively plain (micro)-text might be used or other code types), which contains the full or partial information about which type of part is at what position in the blister (the physical sequence). This information can be either overtly readable or partly or fully cryptographically secured. In a preferred embodiment, the physical sequence or part of the physical sequence is used with overt information in the printed code to produce a cryptographically secured digital signature (additional information may be included in the overt code which can be separated out upon identification by the mobile imaging device). This secured digital signature is also printed or embossed on the blister (preferably as a part for example of the datamatrix code). All this information might also be printed or embossed onto/into the blister at several different locations in different forms (linear matrix codes, plain text, datamatrix codes, etc.), and/or in or on the pharmaceutical package as set forth in further detail below.

As alluded to above, the advantageous methodology of the embodiments described above may also be used with a pharmaceutical package containing one or several blisters, where the codes needed to verify each blister are optionally not on the blisters or are only partly located on the blisters, but all of the codes are also located on the pharmaceutical package (or within the package depending on the embodiment), for being authenticated by comparison to the physical sequence of each blister in the package. In such embodiments, at least two different levels of authentication inspection can be performed by the user. In a first inspection, one or several printed or embossed codes on one or several blisters are read with a scanner, mobile camera, mobile smart phone, or similar device and then compared to the printed or embossed codes on the pharmaceutical package for verification. In a second inspection, the authentication of the blister codes is performed by scanning the codes on the blisters, when present, along with imaging the physical sequence of pills in the blister, and then comparing these elements to confirm whether the pills are actually authentic in that particular blister. The user can decide at various points in the supply chain which level of authentication needs to be performed, e.g., whether the first and/or second inspections described above are required.

To this end, the methodology for simple authentication of blisters and pharmaceutical packages can utilize up to three types of scanned information: images of the physical sequence of pills in the blister; at least one code formed in or located on the blister (the codes can be cryptographically locked and/or provided in open visible form); and at least one code formed in or located on the pharmaceutical package such as a carton box containing one or more blister(s) (and once again, these codes can be cryptographically locked and/or provided in open visible form). Any pair or all three of these types of information can be compared using software installed on the mobile smart phone or similar scanning device to thereby verify authenticity of blisters and/or pills without necessitating delay and reliance on databases and other equipment that may be located away from the package itself. Such an authentication process improves and makes easier the process for preventing counterfeits and fake pills from being distributed in a supply chain, even if those counterfeits are distributed in original authentic packages and blisters. Furthermore, the specific number and placement of codes on these elements of a pharmaceutical package do not affect the advantageous results achieved, which means this method can be adapted to future regulatory and legislative requirements in many jurisdictions.

In each of the embodiments described herein, the verification of the blister(s) can advantageously be made without access to any database and can therefore be free of any internet access (thereby simplifying the requirements for operating the present invention while also speeding up the authentication methods). To this end, all or part of the verification information might also be contained in the verification device itself. However, alternative embodiments may also include communication with offsite resources such as databases, such as when a pharmaceutical company desires to collect information from its supply chain regarding many distinct delivery modes and destinations. For example, this can be advantageous when trying to identify what part(s) of a supply chain have been compromised with fake pills or blisters.

While the present invention has been illustrated by a description of exemplary embodiments and while these embodiments have been described in some detail, it is not the intention of the Applicants to restrict or in any way limit the scope of the appended claims to such detail. Additional advantages and modifications will readily appear to those skilled in the art. The various features described above may be used alone or in any combination depending on the needs and preferences of the user. However, the invention itself should only be defined by the appended claims.

What is claimed is:

1. A method for tracking and tracing pharmaceutical tablets packed in blisters along a supply chain, for the purpose of verifying authenticity thereof, the method comprising:

packaging a plurality of tablets in blister cavities of a blister using a blister packaging machine;

using a 2D camera to read first information related to a positioning of the tablets in the blister cavities, such first information being based on macroscopically visible variations in orientation, marking, size and/or shape of the tablet as detectable with the 2D camera;

using a high-resolution 3D scanner to read second information from a surface of each of the tablets in the blister, such second information being based on a variety of microscopic and/or macroscopic characteristics differentiating the tablets, the 3D scanner having depth resolution of 10 microns or better to detect the variety of characteristics of the tablets;

generating a digital signature that cryptographically secures and links selected subsets of the first and second information from the 2D camera and the 3D scanner into one combined blister code, the combined blister code including a numerical identifying sequence that corresponds to the physical sequence defined by the blister cavities and corresponding visible variations and characteristics of the tablets located in the blister cavities;

printing the combined blister code directly onto the blister at the blister packaging machine;

wherein, after sending the blister along the supply chain from the blister packaging machine, the method further comprises:

conducting a non-forensic level authentication in the supply chain by a mobile imaging device (MID) that has private keys programmed into a memory thereof, wherein public keys are distributed by the pharmaceutical supplier to all users authorized to authenticate tablets along the supply chain, the non-forensic level authentication including 2-dimensional scans using the MID and decrypting using the public keys and private keys to compare the positioning of the tablets in the blister cavities and the visible variations thereon identified in the 2-dimensional scans with the numerical identifying sequence; and conducting a forensic level authentication in the supply chain by a same type of the high-resolution 3D scanner, with the high-resolution 3D scanner having private keys programmed into a memory thereof, and the forensic level authentication including 3-dimensional scans using the high-resolution 3D scanner and decrypting using the public keys and private keys to compare the positioning of the tablets in the blister cavities and the characteristics thereon identified in the 3-dimensional scans with the numerical identifying sequence.

2. The method of claim 1, wherein the mobile imaging device used by the user for the non-forensic level authentication is a mobile phone including a camera, a user interface, and an authentication software application loaded in the memory of the mobile phone, and the method further comprises:

using the camera of the mobile phone to perform the 2-dimensional scans; and using the authentication software application to perform the decrypting and comparing.

3. The method of claim 1, wherein the high-resolution 3D scanner used for the forensic level authentication detects a 3-dimensional surface profile of the tablets in the blister to identify the differentiating physical characteristics of the tablets in 3 dimensions.

4. The method of claim 3, further comprising:

using the high-resolution 3D scanner to establish the surface profile of the elements in the blister by applying at least one of Fourier transform optical coherence tomography and parallel optical coherence tomography.

5. The method of claim 1, further comprising:

identifying the physical size, shape, and orientation of the tablets in the cavities of the blister such that the differentiating physical characteristics can be defined by one or more of the physical size, shape, and orientation of the tablets.

6. The method of claim 1, wherein the elements stored in the blister are pharmaceutical tablets, and the method further comprises:

analyzing, with the 3D scanner, a 3-dimensional surface profile to determine additional forensic physical characteristics of the tablets, including at least one of surface roughness, depth of logos or other elements embossed or printed on the pills, and surface curvatures; and comparing, with the 3D scanner, the additional forensic physical characteristics of the pills with corresponding predetermined characteristics of original pills stored in a database to provide further evaluation of whether the blister and the pills stored therein are authentic.

7. The method of claim 1, wherein the blister code located on the blister includes an overt code embossed or printed on the blister, with the overt code including information corresponding to the physical sequence in combination with additional information about element identity and manufacturing particulars, and the method further comprises:

identifying and separating, with the mobile imaging device, the information corresponding to the physical sequence from the additional information in the overt code such that the information corresponding to the physical sequence can be compared to the physical sequence.

8. The method of claim 1, wherein the blister code located on the blister includes a barcode, a QR code, or a datamatrix code containing encrypted information.

9. The method of claim 1, wherein the blister is stored in a package containing a plurality of blisters each storing tablets therein, and the method further comprises:

detecting the blister code located on at least two of the blisters contained in the plurality of blisters, the blister code also containing identification information regarding the corresponding blister and the tablets stored therein;

detecting at least one package code located on the package, the at least one package code including identification information regarding all of the plurality of blisters contained in the package; and comparing the detected codes on at least two of the blisters with the at least one package code to determine if the package and the blisters stored therein are authentic.

10. The method of claim 1, wherein the mobile imaging device is a smartphone camera, and wherein the high-resolution 3D scanner is a parallel optical coherence tomography (pOCT) scanner.

* * * * *